United States Patent
Lee et al.

(10) Patent No.: US 12,382,439 B2
(45) Date of Patent: Aug. 5, 2025

(54) METHOD OF TRANSMITTING AND RECEIVING DOWNLINK CONTROL CHANNEL AND APPARATUS THEREFOR

(71) Applicant: LG Electronics Inc., Seoul (KR)

(72) Inventors: Sunghoon Lee, Seoul (KR); Jaehyung Kim, Seoul (KR); Suckchel Yang, Seoul (KR); Seonwook Kim, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 417 days.

(21) Appl. No.: 17/770,565

(22) PCT Filed: Jan. 10, 2022

(86) PCT No.: PCT/KR2022/000385
§ 371 (c)(1),
(2) Date: Apr. 20, 2022

(87) PCT Pub. No.: WO2022/154408
PCT Pub. Date: Jul. 21, 2022

(65) Prior Publication Data
US 2023/0042896 A1 Feb. 9, 2023

(30) Foreign Application Priority Data
Jan. 15, 2021 (KR) ................ 10-2021-0006216

(51) Int. Cl.
*H04W 72/04* (2023.01)
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
CPC .................. H04W 72/0446; H04W 72/23
See application file for complete search history.

(56) References Cited

U.S. PATENT DOCUMENTS

2019/0223164 A1   7/2019   He et al.
2020/0045569 A1   2/2020   Seo et al.
(Continued)

FOREIGN PATENT DOCUMENTS

CN   107241178 A   10/2017
CN   110352578 A   10/2019
(Continued)

OTHER PUBLICATIONS

Ericsson, "Remaining Issue of PDCCH Enhancements for NR URLLC," R1-2001784, Presented at 3GPP TSG-RAN WG1 Meeting #100bis, e-Meeting, Apr. 20-30, 2020, 21 pages.
(Continued)

*Primary Examiner* — Melvin C Marcelo
(74) *Attorney, Agent, or Firm* — Fish & Richardson P.C.

(57) ABSTRACT

Disclosed is a method of receiving a physical downlink control channel (PDCCH) through a search space (SS) set by a user equipment (UE) in a wireless communication system. The method includes transmitting first information related to the number of X slots and second information related to the number of at least one Y slot, and receiving a PDCCH through a UE-specific SS (USS) set within the at least one Y slot, based on the first information and the second information. The at least one Y slot is included in the X slots, and X and Y are positive integers.

14 Claims, 14 Drawing Sheets

(56) References Cited

U.S. PATENT DOCUMENTS

| | | | |
|---|---|---|---|
| 2023/0103606 A1 | 4/2023 | Lee et al. | |
| 2023/0147905 A1* | 5/2023 | Li | H04W 72/232 370/329 |
| 2023/0208607 A1* | 6/2023 | Lim | H04L 5/1469 370/280 |
| 2024/0155636 A1* | 5/2024 | Chatterjee | H04L 5/0094 |
| 2024/0357617 A1* | 10/2024 | Tiirola | H04W 72/232 |

FOREIGN PATENT DOCUMENTS

| | | |
|---|---|---|
| CN | 110999479 A | 4/2020 |
| KR | 20200033834 | 3/2020 |
| KR | 20200140745 | 12/2020 |
| WO | WO 2018/231621 A1 | 12/2018 |
| WO | WO 2020206086 | 10/2020 |
| WO | WO 2023080605 | 5/2023 |

OTHER PUBLICATIONS

LG Electronics, "Remaining issues on PDCCH-based power saving signal/channel," R1-2004025, Presented at 3GPP TSG RAN WG1 #101, e-Meeting, May 25-Jun. 5, 2020, 3 pages.

CATT, "Final Summary of PDCCH based Power Saving Signal/Channel," R1-2004724, Presented at 3GPP TSG RAN WG1 Meeting #101-e, e-Meeting, May 25-Jun. 5, 2020, 44 pages.

Office Action in Korean Appln. No. 10-2022-7013588, dated Dec. 20, 2022, 9 pages (with English translation).

Search Report in Korean Appln. No. 10-2022-7013588, dated Nov. 8, 2022, 11 pages (with English translation).

Vivo, "PDCCH enhancements for URLLC," R1-2000325, Presented at 3GPP TSG RAN WG1 #100, e-Meeting, Feb. 24-Mar. 6, 2020, 6 pages.

Fraunhofer HHI & Fraunhofer IIS, "Reduced PDCCH Monitoring for RedCap UEs," R1-2008712, Presented at 3GPP TSG RAN WG1 Meeting #103-e, e-Meeting, Oct. 26-Nov. 13, 2020, 5 pages.

International Search Report in International Appln. No. PCT/KR2022/00038, dated Apr. 21, 2022, 3 pages.

Samsung, "Reduced PDCCH monitoring," R1-2008171, Presented at 3GPP TSG RAN WG1 #103, e-Meeting, Oct. 26-Nov. 13, 2020, 14 pages.

Extended European Search Report in European Appln. No. 22739603.3, mailed on Aug. 2, 2023, 9 pages.

MCC Support, "Final Report of 3GPP TSG RAN WGI #100-e v1.0.0 (Online meeting, Feb. 24-Mar. 6, 2020)," 3GPP TSG RAN WG1 Meeting #100bis-e, R1-2001502, e-Meeting, Apr. 20-30, 2020, 110 pages.

Office Action in Chinese Appln. No. 202280001142.2, mailed on Jul. 24, 2024, 21 pages (with English translation).

* cited by examiner (a)

(b)

(c)

(d)

METHOD OF TRANSMITTING AND RECEIVING DOWNLINK CONTROL CHANNEL AND APPARATUS THEREFOR

CROSS-REFERENCE TO RELATED APPLICATIONS

This application is a National Stage application under 35 U.S.C. § 371 of International Application No. PCT/KR2022/000385, filed on Jan. 10, 2022, which claims the benefit of Korean Application No. 10-2021-0006216, filed on Jan. 15, 2021. The disclosures of the prior applications are hereby incorporated by reference herein in their entirety.

TECHNICAL FIELD

The present disclosure relates to a method of transmitting and receiving a downlink control channel and an apparatus therefor. More specifically, the present disclosure relates to a method of configuring a physical downlink control channel (PDCCH) monitoring duration and an apparatus therefor, in order to reduce power consumption of a user equipment in monitoring a PDCCH.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An object of the present disclosure is to provide a method of transmitting and receiving a downlink control channel and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, provided is a method of receiving a physical downlink control channel (PDCCH) through a search space (SS) set by a user equipment (UE) in a wireless communication system, including transmitting first information related to the number of X slots and second information related to the number of at least one Y slot, and receiving a first PDCCH through a UE-specific SS (USS) set within the at least one Y slot, based on the first information and the second information. The at least one Y slot may be included in the X slots, and X and Y may be positive integers.

A second PDCCH may be received through a common SS (CSS) set within the X slots.

A CSS set to be monitored in the Y slot may be determined to have a higher priority than a USS set to be monitored in the Y slot.

The first information and the second information may be transmitted through capability information represented as (X, Y) which is a combination of the number of X slots and the number of the at least one Y slot.

The X slots may be continuous and the at least one Y slot may be continuous.

A starting slot of the at least one Y slot may not be aligned with a starting slot of the X slots.

In another aspect of the present disclosure, provided herein is a user equipment (UE) for receiving a physical downlink control channel (PDCCH) through a search space (SS) set in a wireless communication system, including at least one transceiver; at least one processor; and at least one memory operably connected to the at least one processor and configured to store instructions causing, when executed, the at least one processor to perform an operation. The operation includes transmitting, through the at least one transceiver, first information related to the number of X slots and second information related to the number of at least one Y slot, and receiving, through the at least one transceiver, a first PDCCH through a UE-specific SS (USS) set within the at least one Y slot, based on the first information and the second information. The at least one Y slot may be included in the X slots, and X and Y may be positive integers.

A second PDCCH may be received through a common SS (CSS) set within the X slots.

A CSS set to be monitored within the Y slot may be determined to have a higher priority than a USS set to be monitored within the Y slot.

The first information and the second information may be transmitted through capability information represented as (X, Y) which is a combination of the number of X slots and the number of the at least one Y slot.

The X slots may be continuous and the at least one Y slot may be continuous.

A starting slot of the at least one Y slot may not be aligned with a starting slot of the X slots.

In another aspect of the present disclosure, provided herein is an apparatus for receiving a physical downlink control channel (PDCCH) through a search space (SS) set in a wireless communication system, including at least one processor; and at least one memory operably connected to the at least one processor and configured to store instructions causing, when executed, the at least one processor to perform an operation. The operation includes transmitting first information related to the number of X slots and second information related to the number of at least one Y slot, and receiving a PDCCH through a UE-specific SS (USS) set within the at least one Y slot, based on the first information and the second information. The at least one Y slot may be included in the X slots, and X and Y may be positive integers.

In another aspect of the present disclosure, provided herein is a computer-readable storage medium including at least one computer program causing at least one processor to perform an operation. The operation includes transmitting first information related to the number of X slots and second information related to the number of at least one Y slot, and receiving a physical downlink control channel (PDCCH) through a UE-specific search space (USS) set within the at least one Y slot, based on the first information and the second information. The at least one Y slot may be included in the X slots, and X and Y may be positive integers.

In another aspect of the present disclosure, provided herein is a method of transmitting a physical downlink control channel (PDCCH) through a search space (SS) set by a base station (BS) in a wireless communication system, including receiving first information related to the number of X slots and second information related to the number of at least one Y slot, and transmitting a PDCCH through a UE-specific SS (USS) set within the at least one Y slot, based on the first information and the second information. The at least one Y slot may be included in the X slots, and X and Y may be positive integers.

In another aspect of the present disclosure, provided herein is a base station (BS) for transmitting a physical downlink control channel (PDCCH) through a search space (SS) set in a wireless communication system, including at least one transceiver; at least one processor; and at least one memory operably connected to the at least one processor and configured to store instructions causing, when executed, the at least one processor to perform an operation. The operation includes receiving, through the at least one transceiver, first information related to the number of X slots and second information related to the number of at least one Y slot, and transmitting, through the at least one transceiver, a PDCCH through a UE-specific SS (USS) set within the at least one Y slot, based on the first information and the second information. The at least one Y slot may be included in the X slots, and X and Y may be positive integers.

Advantageous Effects

According to the present disclosure, the number of times of blind decoding may be reduced by extending a PDCCH monitoring gap of a UE.

Therethrough, the UE may achieve an effect of power saving and reduce load of performing blind decoding many times within a short time.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
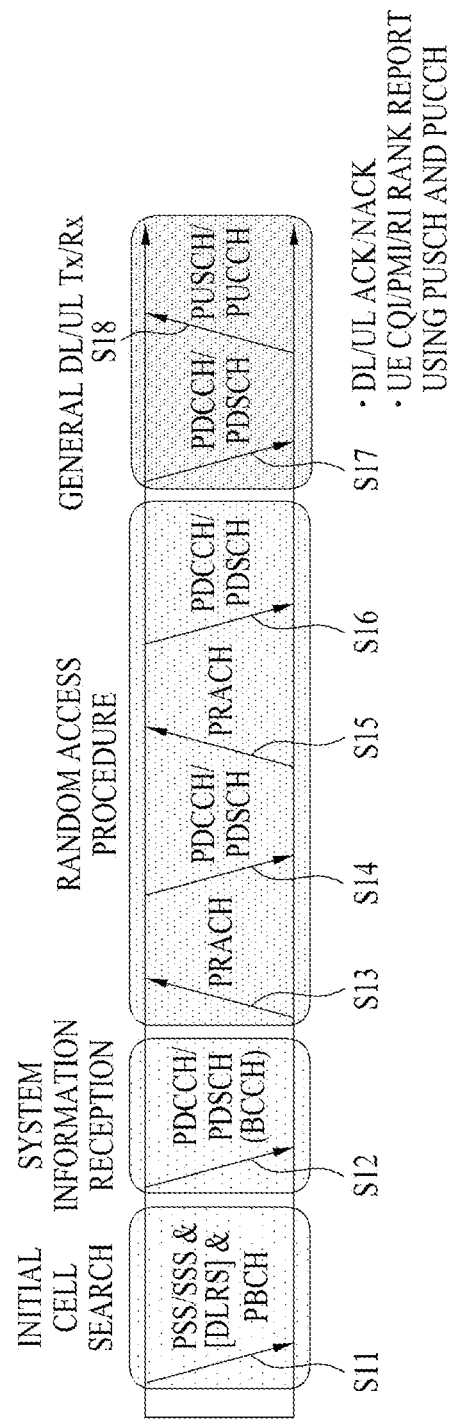
FIG. 1 illustrates physical channels and a general signal transmission method using the physical channels in a 3rd generation partnership project (3GPP) system as an exemplary wireless communication system.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

When the random access procedure is performed in two steps, steps S13 and S15 may be performed as one step (in which Message A is transmitted by the UE), and steps S14 and S16 may be performed as one step (in which Message B is transmitted by the BS).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
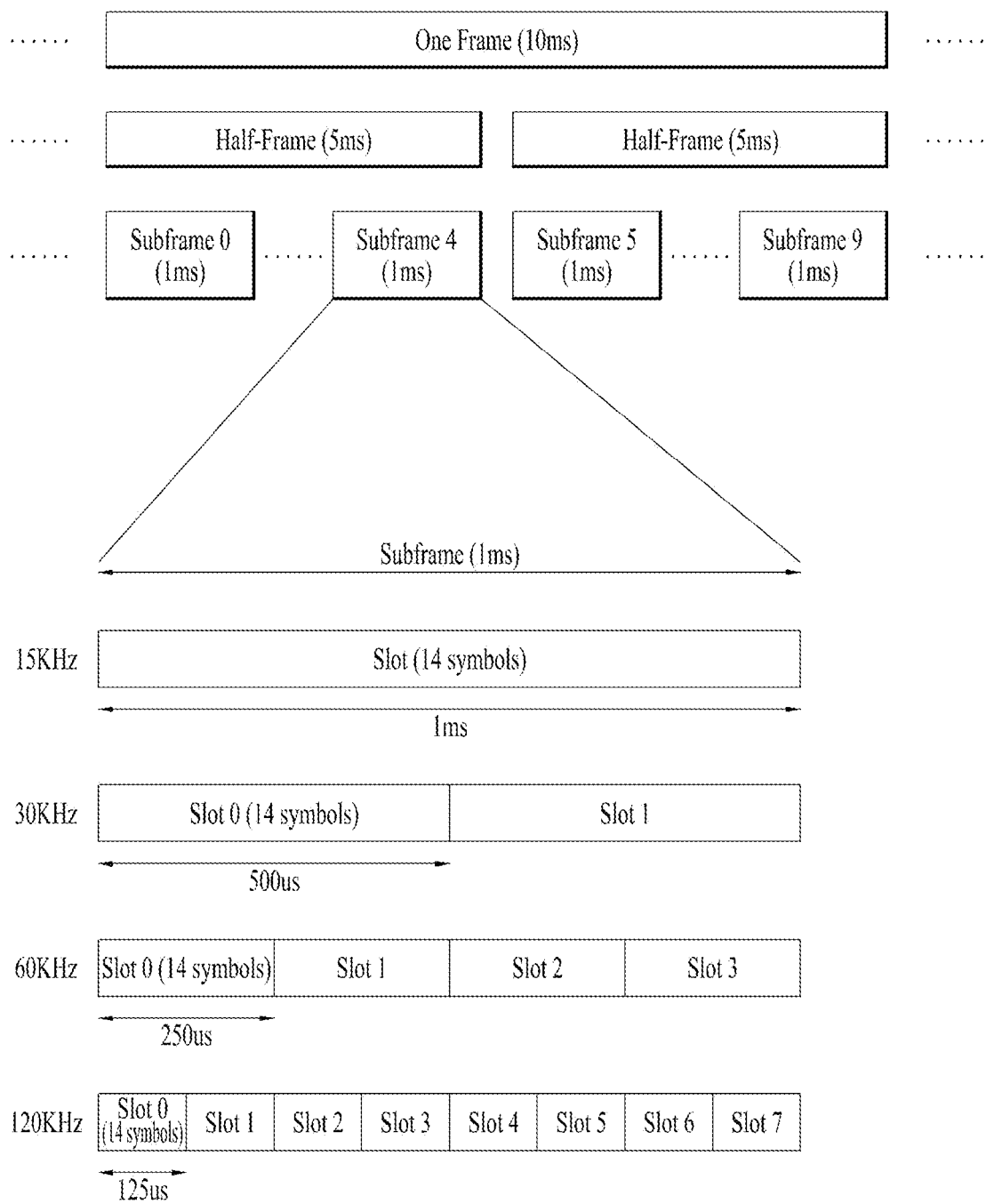
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15 * 2^u) | Nslotsymb | Nframe,uslot | Nsubframe,uslot |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS (15 * 2^u) | Nslotsymb | Nframe,uslot | Nsubframe,uslot |
|---|---|---|---|
| 120 KHz (u = 3) | 14 | 80 | 8 |
| 240 KHz (u = 4) | 14 | 160 | 16 |

*Nslotsymb: number of symbols in a slot
*Nframe,uslot: number of slots in a frame
*Nsubframe,uslot: number of slots in a subframe Table 2 illustrates that the number of symbols per slot, the number of slots per frame, and the number of slots per subframe vary according to SCSs in an extended CP case.

TABLE 2

| SCS (15 * 2^u) | Nslotsymb | Nframe,uslot | Nsubframe,uslot |
|---|---|---|---|
| 60 KHz (u = 2) | 12 | 40 | 4 |

The frame structure is merely an example, and the number of subframes, the number of slots, and the number of symbols in a frame may be changed in various manners. In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
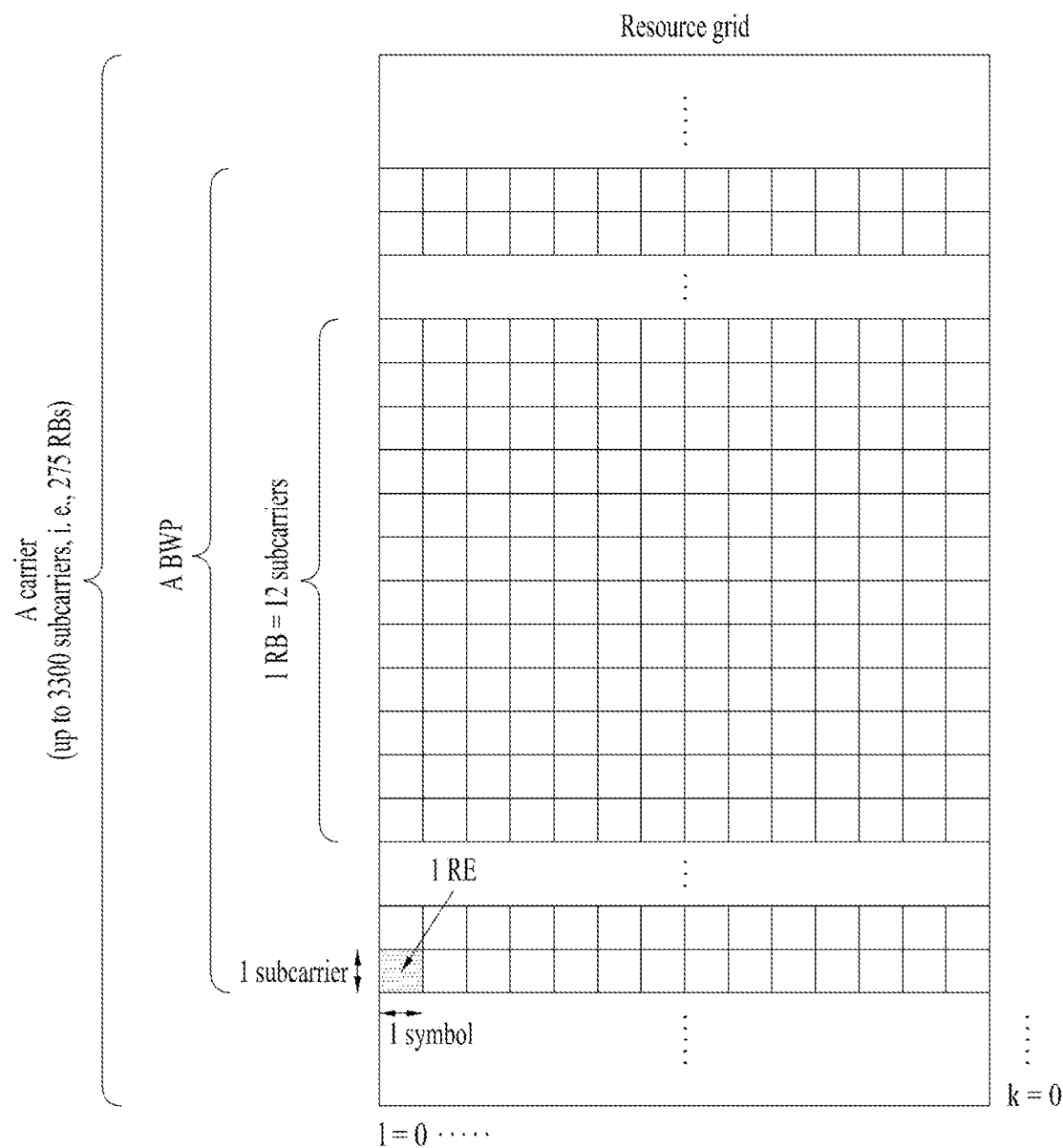
FIG. 3 illustrates a resource grid during the duration of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
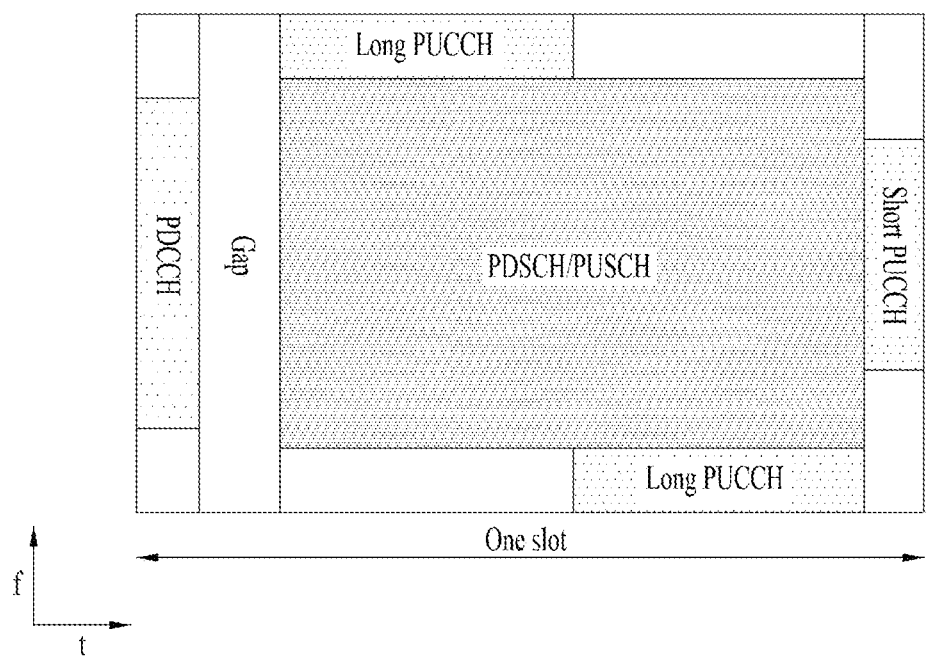
FIG. 4 illustrates exemplary mapping of physical channels in a slot.

FIG. 4 illustrates exemplary mapping of physical channels in a slot.

A DL control channel, DL or UL data, and a UL control channel may all be included in one slot. For example, the first N symbols (hereinafter, referred to as a DL control region) in a slot may be used to transmit a DL control channel, and the last M symbols (hereinafter, referred to as a UL control region) in the slot may be used to transmit a UL control channel. N and M are integers equal to or greater than 0. A resource region (hereinafter, referred to as a data region) between the DL control region and the UL control region may be used for DL data transmission or UL data transmission. A time gap for DL-to-UL or UL-to-DL switching may be defined between a control region and the data region. A PDCCH may be transmitted in the DL control region, and a PDSCH may be transmitted in the DL data region. Some symbols at the time of switching from DL to UL in a slot may be configured as the time gap.

Now, a detailed description will be given of physical channels.

UL Channel Structures

A UE transmits a related signal to the B S on a UL channel, which will be described later, and the BS receives the related signal from the UE through the UL channel to be described later.

(1) Physical Uplink Control Channel (PUCCH)

The PUCCH carries UCI, HARQ-ACK and/or scheduling request (SR), and is divided into a short PUCCH and a long PUCCH according to the PUCCH transmission length.

The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI: feedback information for a DL channel. Multiple input multiple output (MIMO)-related feedback information includes an RI and a PMI.

Table 4 illustrates exemplary PUCCH formats. PUCCH formats may be divided into short PUCCHs (Formats 0 and 2) and long PUCCHs (Formats 1, 3, and 4) based on PUCCH transmission durations.

TABLE 4

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration. PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of 1/3. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

(2) Physical Uplink Shared Channel (PUSCH)

The PUSCH carries UL data (e.g., UL-shared channel transport block (UL-SCH TB)) and/or UL control information (UCI), and is transmitted based a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE transmits the PUSCH by applying transform precoding. For example, when transform precoding is not allowed (e.g., transform precoding is disabled), the UE may transmit the PUSCH based on the CP-OFDM waveform. When transform precoding is allowed (e.g., transform precoding is enabled), the UE may transmit the PUSCH based on the CP-OFDM waveform or the DFT-s-OFDM waveform. PUSCH transmission may be dynamically scheduled by the UL grant in the DCI or may be semi-statically scheduled based on higher layer (e.g., RRC) signaling (and/or Layer 1 (L1) signaling (e.g., PDCCH)) (configured grant). PUSCH transmission may be performed on a codebook basis or a non-codebook basis.

Figure 5:
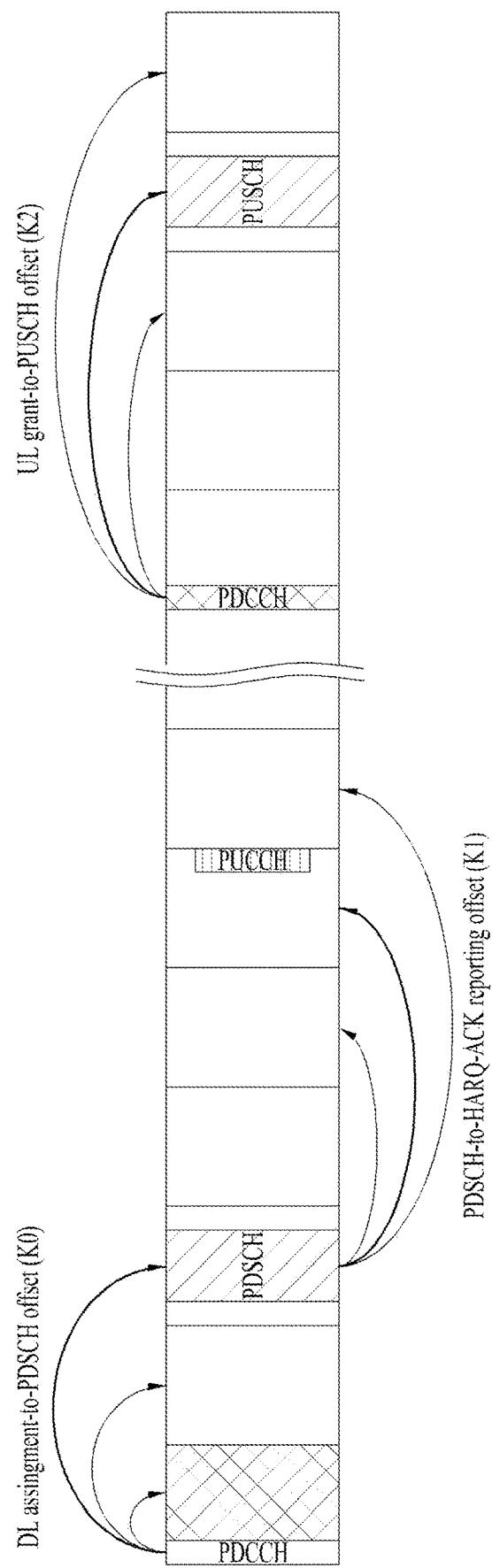
FIG. 5 illustrates a transmission process of physical channels.

FIG. 5 is a diagram for explaining a HARQ-ACK transmission timing and a PUSCH transmission timing and assignment method.

HARQ-ACK is information indicating whether the UE has successfully received a physical DL channel. Upon successfully receiving the physical DL channel, the UE feeds back acknowledgement (ACK) to the BS and, otherwise, the UE feeds back negative ACK (NACK) to the BS. In NR, HARQ supports 1-bit HARQ-ACK feedback per transport block. FIG. 5 illustrates an example of a HARQ-ACK timing K1.

In FIG. 5, KO represents the number of slots from a slot with a PDCCH carrying DL assignment (i.e., DL grant) to a slot with corresponding PDSCH transmission, K1 represents the number of slots from a slot with a PDSCH to a slot with corresponding HARQ-ACK transmission, and K2 represents the number of slots from a slot with a PDCCH carrying a UL grant to a slot with corresponding PUSCH transmission. That is, K0, K1, and K2 may be briefly summarized as shown in Table 5 below.

TABLE 5

|    | A                 | B                              |
|----|-------------------|--------------------------------|
| K0 | DL scheduling DCI | Corresponding DL data transmission |
| K1 | DL data reception | Corresponding HARQ-ACK         |
| K2 | UL scheduling DCI | Corresponding UL data transmission |

The BS may provide a HARQ-ACK feedback timing to the UE dynamically by DCI or semi-statically by RRC signaling. The NR system supports different minimum HARQ processing times for UEs. A HARQ processing time includes delay between a DL data reception timing and a corresponding HARQ-ACK transmission timing and delay between a UL grant reception timing and a corresponding UL data transmission timing. The UE transmits information about the capability of a minimum HARQ processing time thereof to the BS. From the viewpoint of the UE, HARQ ACK/NACK feedback signals for a plurality of DL transmissions in the time domain may be transmitted in one UL data/control region. A timing between DL data reception and corresponding ACK is indicated by the DCI.

Unlike the LTE system in which a transport block (TB)-based or codeword-based HARQ procedure is performed, the NR system supports code block group (CBG)-based transmission of single-bit/multi-bit HARQ-ACK feedback. A TB may be mapped to one or more code blocks (CBs) according to the size thereof. For example, in a channel coding procedure, a cyclic redundancy check (CRC) code is attached to the TB. If a CRC-attached TB is not larger than a certain size, the CRC-attached TB corresponds to one CB. However, if the CRC-attached TB is larger than the certain size, the CRC-attached TB is segmented into a plurality of CBs. In the NR system, the UE may be configured to receive CBG-based transmissions, and retransmission may be scheduled to carry a subset of all CBs of the TB.

Referring to FIG. 5, the UE may detect a PDCCH in slot #n. The PDCCH includes DL scheduling information (e.g., DCI format 1-0 and/or DCI format 1_1). The PDCCH indicates a DL assignment-to-PDSCH offset K0 and a PDSCH-to-HARQ-ACK reporting offset K1. DCI format 1_0 and DCI format 1_1 may include, for example, the following information.

Frequency domain resource assignment: indicates an RB resource assigned to a PDSCH (e.g. one or more (dis)continuous RBs).

Time domain resource assignment: indicates K0 and the starting position (e.g., OFDM symbol index) and length (e.g., the number of OFDM symbols) of a PDSCH in a slot.

PDSCH-to-HARQ_feedback timing indicator: indicates K1.

HARQ process number (4 bits): indicates a HARQ process identity (ID) for data (e.g., a PDSCH or a TB).

PUCCH resource indicator (PM): indicates a PUCCH resource to be used for UCI transmission among a plurality of PUCCH resources in a PUCCH resource set.

Next, the UE may receive a PDSCH in slot #(n+K0) according to scheduling information of slot #n and then transmit UCI on a PUCCH in slot #(n+K1). The UCI includes a HARQ-ACK response to the PDSCH. In the case in which the PDSCH is configured to carry a maximum of one TB, the HARQ-ACK response may be configured as one bit. In the case in which the PDSCH is configured to carry up to two TBs, the HARQ-ACK response may be configured as two bits if spatial bundling is not configured and as one bit if spatial bundling is configured. When slot #(n+K1) is designated as a HARQ-ACK transmission timing for a plurality of PDSCHs, UCI transmitted in slot #(n+K1) includes HARQ-ACK responses to the plurality of PDSCHs.

Referring to FIG. 5, the UE may detect a PDCCH in slot #n. The PDCCH includes UL scheduling information (e.g., DCI format 0_0 and/or DCI format 0_1). DCI format 0_0 and DCI format 0_1 may include the following information.

Frequency domain resource assignment: indicates an RB set assigned to a PUSCH.

Time domain resource assignment: indicates a slot offset K2 and the starting position (e.g., symbol index) and length (e.g., the number of OFDM symbols) of a PUSCH in a slot. The starting symbol and length may be indicated by a start and length indicator value (SLIV) or may be indicated individually.

Thereafter, the UE may transmit the PUSCH in slot #(n+k2) according to the scheduling information of slot #n. Here, the PUSCH includes a UL-SCH TB.

DL Channel Structures

An eNB transmits related signals on later-described DL channels to a UE, and the UE receives the related signals on the DL channels from the eNB.

(1) Physical Downlink Shared Channel (PDSCH)

The PDSCH carries DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH uses a fixed modulation scheme (e.g., QPSK). One PDCCH includes 1, 2, 4, 8, or 16 control channel elements (CCEs) according to its aggregation level (AL). One CCE includes 6 resource element groups (REGs), each REG being defined by one OFDM symbol by one (P)RB.

Figure 6:
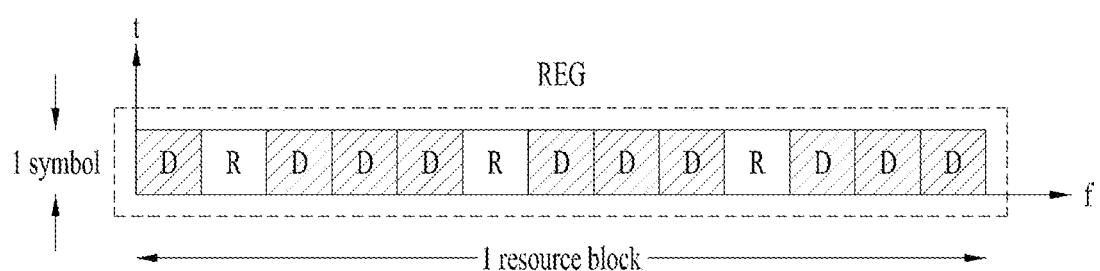
FIGS. 6, 7, and 8 are diagrams illustrating a physical downlink control channel (PDCCH) in the NR system.

FIG. 6 illustrates an exemplary structure of one REG. In FIG. 6, D represents an RE to which DCI is mapped, and R represents an RE to which a DMRS is mapped. The DMRS is mapped to RE #1, RE #5, and RE #9 along the frequency direction in one symbol.

The PDCCH is transmitted in a control resource set (CORESET). The CORESET corresponds to a set of physical resources/parameters used to deliver the PDCCH/DCI in a BWP. For example, the CORESET is defined as a set of REGs with a given numerology (e.g., an SCS, a CP length, or the like). The CORESET may be configured by system information (e.g., a master information block (MIB)) or UE-specific higher-layer signaling (e.g., RRC signaling). For example, the following parameters/information may be used to configure a CORESET, and a plurality of CORESETs may overlap with each other in the time/frequency domain.

controlResourceSetId: indicates the ID of a CORESET.

frequencyDomainResources: indicates the frequency area resources of the CORESET. The frequency area resources are indicated by a bitmap, and each bit of the bitmap corresponds to an RB group (i.e., six consecutive RBs). For example, the most significant bit (MSB) of the bitmap corresponds to the first RB group of a BWP. An RB group corresponding to a bit set to 1 is allocated as frequency area resources of the CORESET.

duration: indicates the time area resources of the CORESET. It indicates the number of consecutive OFDMA symbols in the CORESET. For example, the duration is set to one of 1 to 3.

cce-REG-MappingType: indicates a CCE-to-REG mapping type. An interleaved type and a non-interleaved type are supported.

precoderGranularity: indicates a precoder granularity in the frequency domain.

tci-StatesPDCCH: provides information indicating a transmission configuration indication (TCI) state for the PDCCH (e.g., TCI-StateID). The TCI state is used to provide the quasi-co-location relation between DL RS(s) in an RS set (TCI-state) and PDCCH DMRS ports.

tci-PresentInDCI: indicates whether a TCI field is included in DCI.

pdcch-DMRS-ScramblingID: provides information used for initialization of a PDCCH DMRS scrambling sequence.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an ascending order, starting from 0 for the first OFDM symbol of the lowest-numbered RB in the CORESET.

Figure 7:
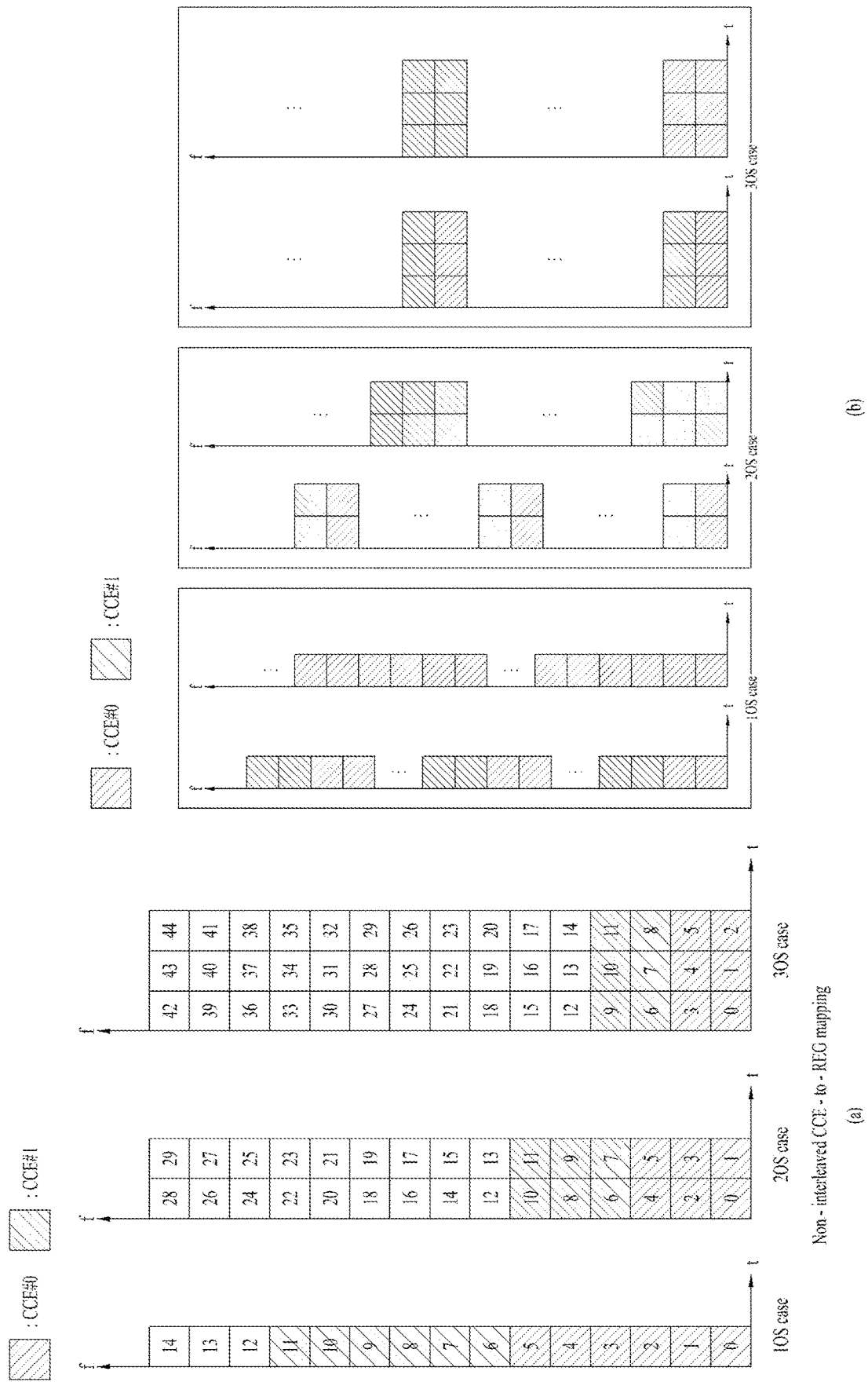

CCE-to-REG mapping for the CORESET may be an interleaved type or a non-interleaved type. FIG. 7(a) is an exemplary view illustrating non-interleaved CCE-REG mapping, and FIG. 7(b) is an exemplary view illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 8:
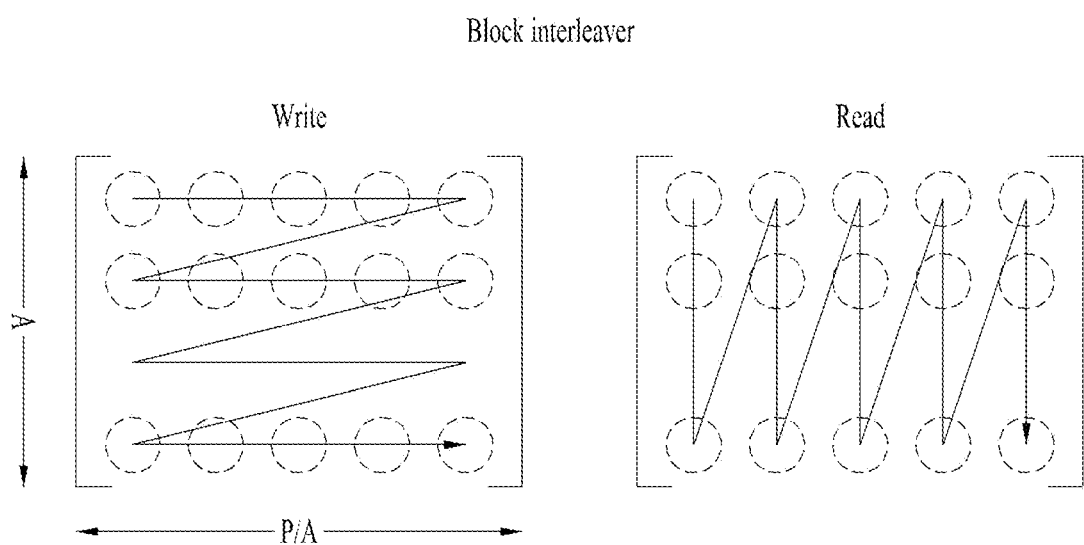
Figure 12:
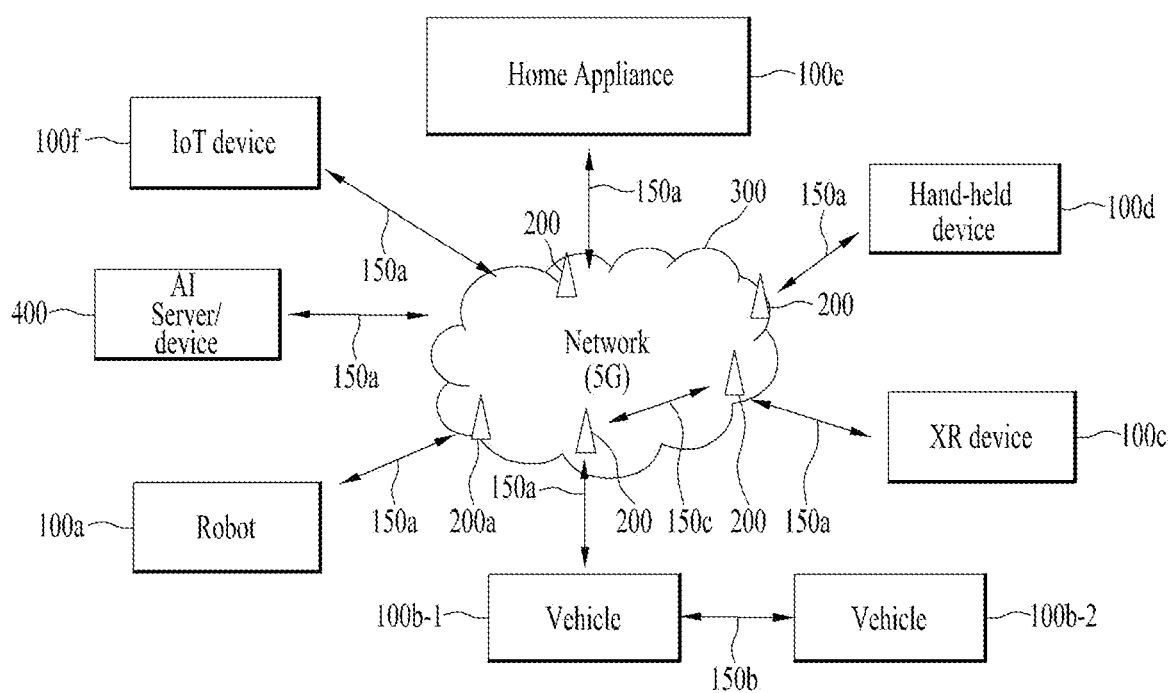
FIG. 12 illustrates an exemplary communication system applied to the present disclosure.

FIG. 8 illustrates an exemplary block interleaver. For the above interleaving operation, the number A of rows in a (block) interleaver is set to one or 2, 3, and 6. When the number of interleaving units for a given CORESET is P, the number of columns in the block interleaver is P/A. In the block interleaver, a write operation is performed in a row-first direction, and a read operation is performed in a column-first direction, as illustrated in FIG. 12. Cyclic shift (CS) of an interleaving unit is applied based on an ID which is configurable independently of a configurable ID for the DMRS.

To receive the PDCCH, the UE may monitor (e.g., blind-decode) a set of PDCCH candidates in the CORESET. The PDCCH candidates are CCE(s) that the UE monitors for PDCCH reception/detection. The PDCCH monitoring may be performed in one or more CORESETs in an active DL BWP on each active cell configured with PDCCH monitoring. A set of PDCCH candidates monitored by the UE is defined as a PDCCH search space (SS) set. The SS set may be a common search space (CSS) set or a UE-specific search space (USS) set.

Table 6 lists exemplary PDCCH SSs.

TABLE 6

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| UE Specific | UE Specific | C-RNTI, or MCS-C-RNTI, or CS-RNTI(s) | User specific PDSCH decoding |

The SS set may be configured by system information (e.g., MIB) or UE-specific higher-layer (e.g., RRC) signaling. S or fewer SS sets may be configured in each DL BWP of a serving cell. For example, the following parameters/information may be provided for each SS set. Each SS set may be associated with one CORESET, and each CORESET configuration may be associated with one or more SS sets.

searchSpaceId: indicates the ID of the SS set.

controlResourceSetId: indicates a CORESET associated with the SS set.

monitoringSlotPeriodicityAndOffset: indicates a PDCCH monitoring periodicity (in slots) and a PDCCH monitoring offset (in slots).

monitoringSymbolsWithinSlot: indicates the first OFDMA symbol(s) for PDCCH monitoring in a slot configured with PDCCH monitoring. The OFDMA symbols are indicated by a bitmap and each bit of the bitmap corresponds to one OFDM symbol in the slot. The MSB of the bitmap corresponds to the first OFDM symbol of the slot. OFDMA symbol(s) corresponding to bit(s) set to 1 corresponds to the first symbol(s) of the CORESET in the slot.

nrofCandidates: indicates the number of PDCCH candidates (e.g., one of 0, 1, 2, 3, 4, 5, 6, and 8) for each AL={1, 2, 4, 8, 16}.

searchSpaceType: indicates whether the SS type is CSS or USS.

DCI format: indicates the DCI format of PDCCH candidates.

The UE may monitor PDCCH candidates in one or more SS sets in a slot based on a CORESET/SS set configuration. An occasion (e.g., time/frequency resources) in which the PDCCH candidates should be monitored is defined as a PDCCH (monitoring) occasion. One or more PDCCH (monitoring) occasions may be configured in a slot.

Table 7 illustrates exemplary DCI formats transmitted on the PDCCH.

TABLE 7

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs. DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

Bandwidth Part (BWP)

The NR system may support up to 400 MHz per carrier. If a UE operating in such a wideband carrier always keeps a radio frequency (RF) module on for the whole carrier, the UE may suffer from great battery consumption. Considering multiple use cases (e.g., eMBB, URLLC, mMTC, V2X, etc.) in one wideband carrier, different numerologies (e.g., subcarrier spacings) may be supported for different frequency bands of the carrier. Each UE may have a different capability regarding a maximum bandwidth. In this regard, an eNB may indicate a UE to operate only in a part of the bandwidth of the wideband carrier, not across the total bandwidth. Such a partial bandwidth is referred to as a BWP. A BWP is a subset of contiguous common resource blocks defined for numerology $\mu i$ in BWP i in the frequency domain, and one numerology (e.g., subcarrier spacing, CP length, or slot/mini-slot duration) may be configured for the BWP.

The gNB may configure one or more BWPs in one carrier configured for the UE. If UEs are concentrated in a specific BWP, some UEs may be switched to another BWP, for load balancing. For frequency-domain inter-cell interference cancellation between adjacent cells, BWPs at both ends of the total bandwidth of a cell except for some center spectrum may be configured in the same slot. That is, the gNB may configure at least one DL/UL BWP for the UE associated with the wideband carrier, activate at least one of DL/UL BWP(s) configured at a specific time (by L1 signaling which is a physical-layer control signal, a MAC control element (CE) which is a MAC-layer control signal, or RRC signaling), indicate the UE to switch to another configured DL/UL BWP (by L1 signaling, a MAC CE, or RRC signaling), or set a timer value and switch the UE to a predetermined DL/UL BWP upon expiration of the timer value. To indicate switching to another configured DL/UL BWP, DCI format 1_1 or DCI format 0_1 may be used. Particularly, an activated DL/UL BWP is referred to as an active DL/UL BWP. During initial access or before RRC connection setup, the UE may not receive a DL/UL BWP configuration. A DL/UL BWP that the UE assumes in this situation is referred to as an initial active DL/UL BWP.

A DL BWP is a BWP used to transmit and receive a DL signal such as a PDCCH and/or a PDSCH, and a UL BWP is a BWP used to transmit and receive a UL signal such as a PUCCH and/or a PUSCH.

The present disclosure proposes a method for extending a PDCCH monitoring gap to a plurality of slots longer than one slot in order to achieve power saving of the UE and reduce load caused by excessive PDCCH monitoring.

The PDCCH monitoring gap may be defined as a gap between starting times of units in which the UE monitors a PDCCH. For example, in a Rel-15 NR system, PDCCH monitoring is performed in units of one slot and the starting time of PDCCH monitoring is a starting symbol of a slot. Accordingly, a gap between the starting symbol of the first slot and the starting symbol of the second slot is one slot. Therefore, an existing PDCCH monitoring gap may be considered to be one slot.

A maximum of 10 SS sets per BWP may be configured for the UE. The UE may monitor PDCCH candidates included in the SS sets (hereinafter, SS set monitoring).

Since the UE should perform blind decoding (BD) upon a PDCCH in a state in which the UE is unaware of when the PDCCH will be received and which DCI format will be received, PDCCH monitoring occupies a large portion in power consumption.

The maximum number of PDCCH candidates that the UE may monitor based on one slot is limited. For example, the maximum number of PDCCH candidates (hereinafter, 'BD limit') that the UE is capable of monitoring per slot and per serving cell with respect to each SCS defined in the standard document 38.213 may be defined as shown in [Table 8].

In addition, the maximum number of non-overlapped CCEs (hereinafter, 'CCE limit') per slot and per serving cell with respect to each SCS defined in the standard document 38.213 may be defined as shown in [Table 9].

TABLE 8

| μ | Maximum number of monitored PDCCH candidates per slot and per serving cell $M_{PDCCH}^{max,slot,\mu}$ |
|---|---|
| 0 | 44 |
| 1 | 36 |
| 2 | 22 |
| 3 | 20 |

TABLE 9

| μ | Maximum number of non-overlapped CCEs per slot and per serving cell $C_{PDCCH}^{max,slot,\mu}$ |
|---|---|
| 0 | 56 |
| 1 | 56 |
| 2 | 48 |
| 3 | 32 |

As technology for power saving of a future wireless communication system (e.g., Rel-17 NR system) or load reduction of the UE, the maximum number of PDCCH candidates that the UE may monitor per slot, as defined in [Table 8], may be applied to X slots in order to reduce the number of times of PDCCH monitoring of the UE, where X may be a natural number greater than 1. Therethrough, an effect of reducing the number of times of monitoring and the number of times of BD, in a total operating time of the UE, may be obtained.

In order to extend the PDCCH monitoring gap, various operations and variables (e.g., an X value, an SS set dropping rule, priority of an SS set, and Y slots corresponding to a new window for applying the dropping rule when the dropping rule is not applicable to the entire X slots) may be defined. The BD limit and the CCE limit may mean the number of PDCCH candidates (e.g., the number of times of BD) that the UE should monitor during a unit time and the number of CCEs, respectively.

If the UE is capable of receiving an indication for extending the PDCCH monitoring gap, there may be a great advantage in terms of power consumption of the UE, and load needed to perform much monitoring in a short time may be reduced. To this end, related variables may be preconfigured/indicated by a higher layer (e.g., radio resource control (RRC) layer).

Accordingly, an embodiment of the present disclosure proposes a method for extending the PDCCH monitoring gap of the UE. To this end, an X slot value, which is an extended PDCCH monitoring gap, a new SS set dropping rule, a Y slot value for applying the dropping rule, and the like may be defined. In addition, a UE/BS operation in association with an SS set configuration related to the PDCCH monitoring gap is defined.

Hereinbelow, methods, embodiments, or options will be separately described for clarification of explanation and should not be limitedly interpreted as a meaning that they are independently performed. For example, [Embodiment #1] to [Embodiment #4] to be described later may be implemented individually but at least some thereof may be implemented in a combined form within a scope that does not conflict with each other.

Prior to a detailed description of the present disclosure, the overall operation processes of the UE and the BS according to an embodiment of the present disclosure will now be described.

Figure 9:
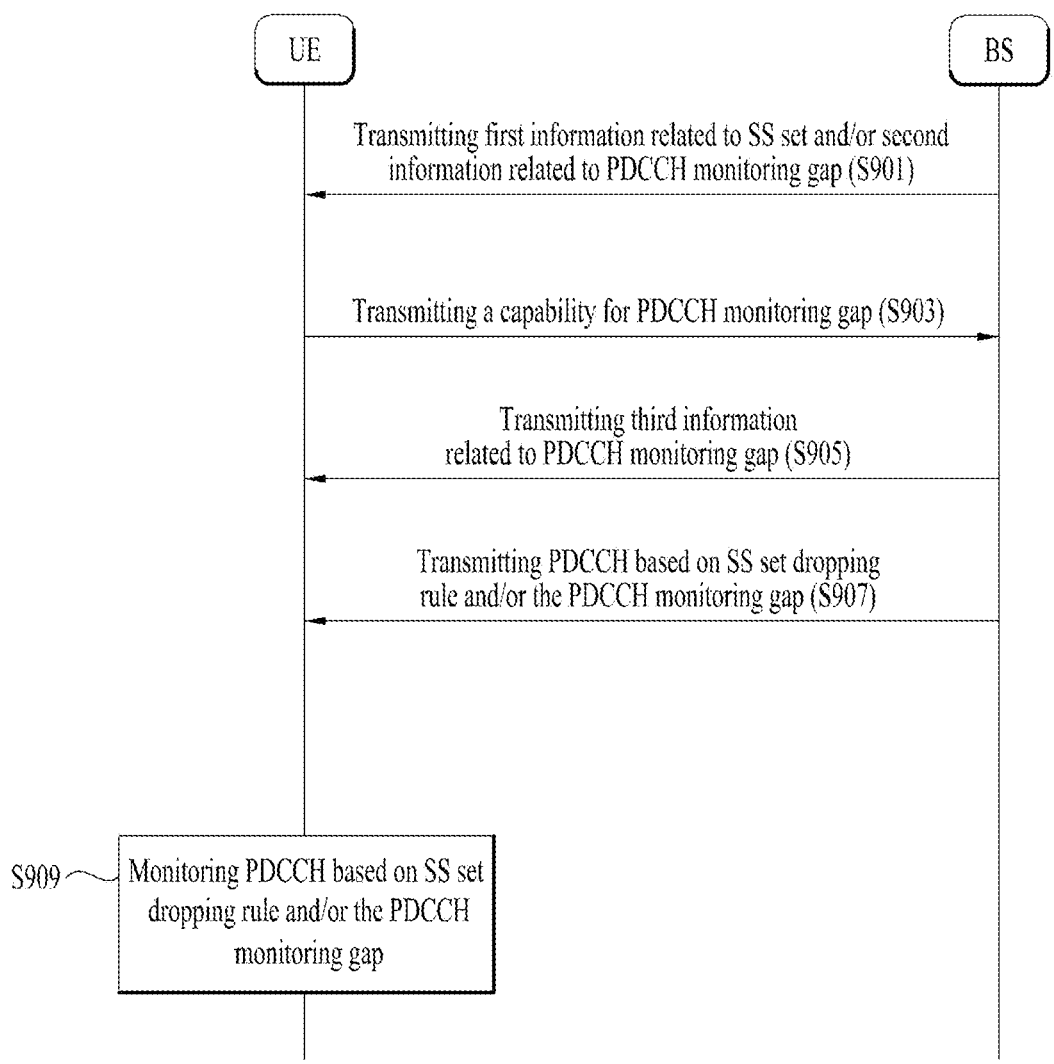
FIG. 9 is a diagram for explaining the overall operation processes of the UE and the BS according to an embodiment of the present disclosure.

FIG. 9 is a diagram for explaining the overall operation processes of the UE and the BS according to an embodiment of the present disclosure.

Referring to FIG. 9, the UE may receive first information about an SS set and/or second information related to a PDCCH monitoring gap from the BS (S901). In this case, the UE may receive the first information and/or the second information through RRC. The second information may include, for example, at least one of an X slot value when the PDCCH monitoring gap is extended, a new SS set dropping rule, a Y slot value for applying the dropping rule, or a periodicity of SS set monitoring for the extended PDCCH monitoring gap. The first information may include a plurality of pieces of information about the SS set. The second information may also include a plurality of pieces of information related to the PDCCH monitoring gap.

For example, the second information may include a plurality of X slot values, SS set dropping rules, Y slot values, and/or periodicities of SS set monitoring for the extended PDCCH monitoring gap.

A detailed operation of S901 may be based on [Embodiment #1] to [Embodiment #4].

The UE may transmit capability information for the PDCCH monitoring gap to the BS in order to extend the PDCCH monitoring gap (S903). The UE may transmit the capability information in the form of (X, Y), which is a combination of the X slot value and the Y slot value, through RRC signaling and/or UCI. A detailed operation for this information transmission may be based on [Embodiment #4].

The UE may receive third information related to the PDCCH monitoring gap (S905). For example, if a plurality of pieces of information related to the PDCCH monitoring gap is included in the second information in step S901, any one of the plurality of pieces of information may be indicated through downlink control information (DCI) or a MAC CE.

A detailed operation for step S905 may be based on [Embodiment #1] to [Embodiment #4].

In step S903, when it is determined that power saving of the UE is needed or that load needs to be reduced, the UE may make a request for such determination to the BS.

If it is determined that the BS does not have information/channels to be transmitted to the UE for a predetermined time even when the UE does not transmit the capability information, the third information may be indicated for power saving of the UE.

That is, only one of the two steps S903 and step S905 may be selectively performed. For example, if step S903 is performed, step S905 may be omitted, and if step S903 is omitted, step S905 may be performed. Alternatively, both steps S903 and S905 may be omitted according to an operation related to a timer to be described later.

However, it is obvious that steps S903 and S905 may operate together. For example, if the UE transmits a plurality of (X, Y) combinations in step S903, the BS may include any one of the plurality of (X, Y) combinations in the third information and transmit the third information to the UE.

When a timer related to data transmission (e.g., a timer which is associated with a MAC timer or a discontinuous reception (DRX) timer or configured separately) expires, it may be expected that the UE and the BS will perform an operation for extending the PDCCH monitoring gap without a separate indication or request.

The above-described capability information transmission of the UE and/or the indication of the BS may be initiated through DCI and/or UCI and is not limited to a specific format. The above-described capability information transmission of the UE and/or the indication of the BS may also be performed through a MAC CE or RRC.

The above-mentioned capability information transmission of the UE, the indication of the BS, and the operation of the timer are called triggering.

The PDCCH monitoring gap may be extended after a predetermined time from triggering.

The predetermined time may be predefined or information thereabout may be transmitted to the UE through RRC signaling and/or DCI. Therethrough, a PDCCH monitoring starting timing caused by the extended PDCCH monitoring gap may be determined.

To indicate release/termination of the UE operation based on PDCCH monitoring gap extension, the same method as any one of the methods used for initiation of the UE operation (e.g., the above-described three triggering operations) based on the PDCCH monitoring gap extension may be used.

The BS may transmit a PDCCH to the UE based on information about the SS set dropping rule and/or the PDCCH monitoring gap based on the first information, the second information, and/or the third information (S907).

The UE may monitor and receive the PDCCH based on the information about the SS set dropping rule and/or the PDCCH monitoring gap based on the first information, the second information, and/or the third information (S909).

Detailed operations of the UE and the BS based on S907 and S909 may be based on [Embodiment #1] to [Embodiment #4].

The UE may perform the operation proposed in the present disclosure even without triggering. For example, in a special case, such as the case in which a problem occurs in an RRC configuration or power saving of the UE is urgently required even if PDCCH monitoring gap extension is not indicated, the UE may perform a PDCCH monitoring gap extension operation by determination thereof. For example, in a situation in which the battery capacity of the UE is very low (e.g., when the battery is less than a predetermined threshold), it may be assumed that the UE performs a random access procedure while performing handover of a cell.

As PDCCH monitoring gap extension is initiated, the UE may continuously perform the operation based on PDCCH monitoring gap extension to be described later (until the end of the corresponding operation is indicated). Alternatively, the UE may periodically perform the corresponding operation (until the end of the corresponding operation is indicated) or perform the corresponding operation only for a predetermined time (e.g., a predetermined time based on a timer). Alternatively, the corresponding operation may be terminated as an event condition for terminating the corresponding operation is satisfied.

At least some of [Embodiment #1] to [Embodiment #4] described below may be selectively applied to the method proposed by the present disclosure. Each embodiment may be implemented in an independent form without a separate combination with other embodiments, or one or more embodiments may be implemented in a combined and associated form. Some terms, symbols, order, etc. used for a description of the present embodiments may be replaced with other terms, symbols, order, etc. as long as the principle of the disclosure is maintained.

Hereinafter, while the present disclosure will be described by exemplifying an arbitrary structure for PDCCH monitoring gap extension and DCI transmission/reception in order to explain the principles of the embodiments, the proposed embodiments are not limited to a specific DCI transmission/reception type unless separately specified. Therefore, it is obvious that the embodiments proposed in the present disclosure may be applied to a PDCCH monitoring gap extension operation according to DCI transmission/reception, as long as the principles of the embodiments are not violated, even if there is no additional description.

Now, embodiments for extending the PDCCH monitoring gap according to the X slot value will be described.

1. Embodiment #1: Configuration of X Slot Value p Embodiments of the present disclosure propose a technique for extending the PDCCH monitoring gap. Then, the number of times of PDCCH monitoring of the UE out of the entire operating time of the UE may be reduced.

An X slot value for extending the PDCCH monitoring gap based on one slot in a legacy NR system to X slots should be configured. For example, candidates of the X slot value may be configured through an RRC configuration of the UE and the BS. In this case, the candidates of the X slot value may be natural numbers greater than 1.

If the request of the UE and/or the indication of the BS is performed through DCI (or UCI), the X slot value may be explicitly indicated.

Alternatively, when the operation of the present disclosure is based on a timer rather than the DCI, the X slot value may be set to a fixed value or to a preset value according to a specific condition. For example, the X slot value may be changed according to an SCS. For example, the X slot value may be a value promised in advance based on a current SCS of the UE.

Alternatively, the candidates of the X slot value may be values of which the UE informs the BS through a capability report. In this case, the capability report may be transmitted through RRC signaling and/or UCI.

The UE may inform the BS of one or more X slot values based on various information such as a current channel state and/or a degree of coverage. The BS may select one of the one or more X slot values and indicate the selected X slot value to the UE. Alternatively, the UE may notify the BS of one X slot value.

A periodicity of an SS set in a current NR system may be configured as one of 1, 2, 4, 5, 8, 10, 16, 20, 20, 40, 80, 160, 320, 650, 1280, and 2560, which are slot units. In this case, the X value may be configured to be aligned with the periodicity of the SS set. This is because, when the periodicity of the SS set and the X slot value are configured to be aligned with each other, it may be easy to change the periodicity of the SS set according to the X slot value. Alternatively, the X value may be set to a prime number so that the X slot value is not aligned with the SS set.

If the X slot value is configured to be aligned with the periodicity of the SS set, there may be a case in which monitoring of a specific SS set is always excluded.

For example, if the X slot value is configured to be aligned with the periodicity of the SS set and the priority of the SS set is determined in temporal order, a specific SS set may always be located in a later slot in time among the X slots due to an offset of the specific SS set since the periodicity of the specific SS set coincides with the X slot value or has a multiple relationship with the X slot value.

To prevent this situation, a timing to which the SS set dropping rule is applied within the X slots may be different. For example, a position of a slot from which application of the SS set dropping rule is started may be different in every X slots.

For example, a mod(n/X)-th slot in the n-th X slots may be selected as a starting slot for applying the SS set dropping rule.

2. Embodiment #2: Periodicity of SS Set Based on X Slot Value

One X slot value may be configured so that the UE and the BS may share the X slot value. For example, in [Embodiment #1], the BS may transmit candidates of the X slot value to the UE through RRC signaling, or the UE may transmit the candidates of the X slot value to the BS through a capability report and the BS may select one of the candidates of the X slot value through the DCI and/or the MAC CE. Thus, the UE and the BS may share one X slot value. Alternatively, if the UE transmits one X slot value to the BS through the capability report according to [Embodiment #1], the one X slot value may be shared between the UE and the BS.

In this case, the BS may change the periodicity of the SS set according to the one X slot value.

For example, when X=2, the BS may double the periodicity of the SS set configured for the UE. In this case, for a common search space (CSS) simultaneously configured for a plurality of UEs, since it may be difficult to change the periodicity of a CSS set by focusing upon only one UE, the periodicity of the CSS set may be maintained regardless of the X slot value as an exceptional case of change the periodicity of the SS set.

However, even in this case, an overlapped CSS may be excluded based on the SS set dropping rule described later in [Embodiment #3]. Alternatively, the BS may configure the periodicity of the SS set for the UE so as to easily apply the SS set dropping rule in consideration of the PDCCH monitoring gap extension operation according to [Embodiment #1] to [Embodiment #4]. For example, if the BS configures the candidates of the X slot value for the UE through RRC signaling, the BS may determine the periodicity of the SS set that may be aligned with the corresponding candidates of the X slot value and inform the UE of the determined periodicity of the SS set.

In this dynamic change of the periodicity of the SS set, the UE may fail to detect DCI transmission of the BS for indicating the PDCCH monitoring gap extension operation, or a problem may arise in a time to which the PDCCH monitoring gap extension operation is applied so that the periodicity of the SS set shared by the BS and the UE may not match.

In this case, since the UE has the capacity to monitor the PDCCH within one slot, the PDCCH monitoring gap may fall back from the X slots to one slot again. For example, although the BS has changed the periodicity of the SS set based on the X slot value, the UE may fail to receive a signal indicating the changed periodicity of the SS set (e.g., RRC signaling and/or DCI) and perform PDCCH monitoring based on one slot.

In this case, since the UE may determine whether the periodicity of the SS set is changed by checking a monitoring occasion (MO) of the SS set. The UE may inform the BS that the periodicity of the SS set recognized by the BS and the periodicity of the SS set recognized by the UE do not match or the UE may perform the PDCCH monitoring gap extension operation based on the checked periodicity of the SS set.

For example, the UE may monitor the PDCCH according to the periodicity of the SS set based on one slot. If a pattern in which the PDCCH is not detected at a specific interval continues for more than a certain time, the UE may recognize that the periodicity of the SS set has been changed according to the pattern and inform the BS that the periodicity of the SS set has been changed or may perform the PDCCH monitoring gap extension operation based on the periodicity of the SS set according to the pattern.

3. Embodiment #3: SS Set Dropping Rule

The BS may operate such that the periodicity of the SS set is not changed according to the X slot value or may not change the periodicity of the SS set. In this case, when the PDCCH monitoring gap of the UE is extended to the X slot value, MOs for SS sets of overlapped IDs in one X slot may be configured.

In this case, as the monitoring capabilities of the UE decreases, it is necessary to select SS sets to be monitored by the UE and drop unselected SS sets. Therefore, a rule for determining an SS set to be preferentially monitored and an SS set to be dropped may be configured by configuring priorities of SS sets. This is called the SS set dropping rule.

Hereinafter, the aforementioned SS set dropping rule will be described.

[Option 1]

The UE may apply the SS set dropping rule from the first slot in the X slots to determine the number of PDCCH candidates for the first slot and may sequentially apply the remaining number of PDCCH candidates to the next slots.

For example, the monitoring capacity of the UE may be based on a BD/CCE limit, and the embodiments of the present disclosure may be implemented in an application manner of distributing the BD/CCE limit of one slot in the legacy NR system to the X slots. In this case, the UE calculates the number of PDCCH candidates or non-overlapped CCEs in the first slot, which is the foremost slot in time within the X slots. In addition, the BD/CCE limit obtained by subtracting the number of PDCCH candidates or non-overlapped CCEs calculated for the first slot from the maximum number of PDCCH candidates or non-overlapped CCEs is applied to the next second slot to calculate the number of PDCCH candidates or non-overlapped CCEs. In this way, the SS set dropping rule may be sequentially applied in temporal order within the X slots. The SS set dropping rule may be the same as that of the legacy NR system or may be one of Options 2, 3, and 4 to be described later. If one of Option 2, 3, and 4 is applied, it may be assumed that the SS set dropping rule is separately applied to the X slot where X=1.

Alternatively, since the BS is aware that the X slots have been configured and the PDCCH monitoring extension operation is performed, the UE may apply the SS set dropping rule from the second slot among the X slots under the assumption that the number of PDCCH candidates or non-overlapped CCEs is configured to always satisfy the BD/CCE limit for the first slot in the X slots.

[Option 2]

The UE may configure the priority of a front SS set in time to be high with respect to SS sets of the same ID in the X slots.

Since the UE applies the BD/CCE limit conventionally applied in one slot to the X slots, the number of PDCCH candidates to be blind-decoded per slot may be reduced. Therefore, it may be advantageous to avoid monitoring the SS sets of the overlapping ID. Accordingly, the UE may perform PDCCH monitoring by configuring the priorities of the SS sets based on time. For example, if X=2 and MOs of specific SS sets are located in the first and seventh symbols of the first slot, and the first and seventh symbols of the second slot, the UE may monitor an SS set located in the first symbol of the first slot, which is the earliest in time, and may drop monitoring the remaining SS sets having the same ID as the corresponding SS set.

That is, among the SS sets located in the seventh symbol of the first slot and the first and seventh symbols of the second slot, the UE may not monitor SS sets having the same ID as the corresponding SS set and may monitor SS sets having different IDs from the corresponding SS set.

Option 2 may have an advantage in terms of power saving of the UE. In the case of SS sets of the same ID, there is a high possibility that the PDCCH contains the same information. Therefore, in consideration of the limited capabilities of the UE, repeatedly monitoring the SS sets of the same ID may be determined to be a waste of resources of the UE. According to Option 2, the number of times of PDCCH monitoring (i.e., the number of times of BD) may be reduced while receiving DCI of different information as much as possible, thereby achieving a power saving effect.

[Option 3]

The UE may configure priorities based on IDs of SS sets in the X slots.

The UE may configure the priorities of IDs of specific SS set(s) in the X slots to be high, so that the UE may perform an operation such that the probability that the SS set(s) of the corresponding IDs is dropped during PDCCH monitoring is low. In other words, the UE may preferentially select an SS set of an ID having a high priority in all of the X slots to fill a PDCCH candidate and sequentially select an SS set of the next priority. In other words, the UE may determine PDCCH candidates in order of preferentially selecting an SS set of an ID having a high priority in all of the X slots, excluding the SS set of the corresponding ID from the maximum number of PDCCH candidates, selecting an SS set of an ID having the next high priority, and excluding the SS set of the corresponding ID from the number of remaining PDCCH candidates.

In this case, even SS sets of the same ID may be monitored if the priorities thereof are high.

In Option 3, the possibility that monitoring of an important SS set is dropped may be eliminated by configuring the priority of the important SS set (e.g., CSS) to be high. That is, the UE may determine priorities of SS sets in order of importance, perform BD based on the determined priority, and receive information through the corresponding SS set. In Option 2 earlier, if an SS set is always selected in temporal order, it may be difficult for the BS to perform PDCCH scheduling.

For example, information that should be necessarily transmitted to the UE should always be located in a front symbol or slot in time within the X slots. However, if the BS simultaneously performs scheduling for a plurality of UEs, a scheduling problem may occur. Accordingly, Option 3 has the advantage of facilitating scheduling of the BS.

[Option 4]

Priorities may be configured according to the periodicities of SS sets. That is, the UE may determine the priority of an SS set in consideration of the periodicity of the SS set.

For example, the UE may reduce the number of times of PDCCH monitoring by configuring the priority of an SS set with a short periodicity to be lower. In this case, the probability of monitoring SS sets having longer periodicities may be increased by less frequently monitoring SS sets with short periodicities to which more MOs may be allocated in the X slots. In other words, the probability of monitoring multiple SS sets within the X slots may be increased.

In contrast, the priority of an SS set having a short periodicity may be configured to be higher. When the periodicity of an SS set is short, this means that the PDCCH is transmitted more frequently through the corresponding SS set and it may be determined that the BS schedules the periodicity of the corresponding SS set to be short in order to increase the probability of transmitting the PDCCH to the UE through the corresponding SS set. Therefore, the BS may cause the UE to frequently perform monitoring of the SS set having a short periodicity, so that the UE may certainly monitor information that should be necessarily transmitted.

There may be a rule that should always be configured while the aforementioned SS set dropping rule is performed. For example, in a CSS, a BD limit may be configured to exceed that in the method proposed in the present disclosure. The CSS has been designed to have a high priority even in the SS set dropping rule of the legacy NR system and to always be monitored.

Therefore, if the SS set dropping rule is applied to the CSS as in the method proposed in the present disclosure, the probability of monitoring other SS sets may be reduced as much as reduction of the BD limit of the UE. Therefore, the SS set dropping rule proposed in the present disclosure may be applied to SS sets except for the CSS, and the maximum value of the BD limit may be configured to be the same as that of the legacy NR system. For convenience, while a description has been given based on the CSS, an important SS set that should always be monitored may be configured in the same manner as described above.

For example, the BD/CCE limit of the CSS and the BD/CCE limit of a UE-specific search space (USS) may be separately configured. Assuming that the BD limit applicable to the X slots is 44, the number of times of BD corresponding to a predetermined ratio of the BS limit may be necessarily used for CSS monitoring. Here, the aforementioned predetermined ratio may be different according to circumstance and may be a preconfigured value or a predetermined fixed value.

Alternatively, the BD/CCE limit of the legacy NR system may be applied only to the USS. For example, if it is assumed that the BD limit applicable to the X slots is 44, BD may be performed for CSS monitoring without limitation, and the BD limit of 44 may be used only for USS monitoring. That is, the BD limit is only for the USS and is not applied to the CSS, and all assigned CSSs may be monitored.

For example, the SS set dropping rule may be applied only to the USS and may not be applied to the CSS.

By the methods described above, CSS monitoring may be configured to always be preferentially performed.

The UE may operate to prioritize monitoring a slot in which the CSS is included. In other words, the SS set dropping rule may be preferentially applied to the slot in which the CSS is transmitted in the X slots and may be sequentially applied to the remaining slots. For example, when X=4, if there is no CSS in the X slots, the SS set dropping rule may be sequentially applied to slots starting from the first slot. In contrast, when the CSS is present in the third slot, the SS set dropping rule may be preferentially applied to the third slot and then the SS set dropping rule for the remaining BD limit may be applied to slots starting from the first slot or the fourth slot which is the next slot after the third slot.

The UE may flexibly change a monitoring capacity according to a scheduling and traffic situation. For example, when traffic continues even if the DB limit of one slot is applied to the X slots so that it is determined that much PDCCH monitoring is required, the DB limit applied to the X slots may be sequentially increased to the BD limit of 2 slots, the BD limit of 3 slots, or the like. For example, when X=4 and BD limit=44, if many PDCCHs have already not been monitored due to the SS set dropping rule in the first slot in the X slots, the BD limit may be increased to 88 based on traffic in the second slot. In other words, if the number of SS sets capable of performing PDCCH monitoring is less than a certain number in the first slot due to the SS set dropping rule, the BD limit may be increased in the second slot or from the second slot and the BD limit to be increased may be based on traffic.

If the BD/CCE limit does not cause any problem even when the UE applies the SS set dropping rule to all of the X slots, SS sets of the same ID may also be monitored. For example, if the number of times of DB and the number of CCEs based on all allocated SS sets in the X slots do not exceed the BD/CCE limit, the UE may perform monitoring of all of the SS sets without applying the SS set dropping rule.

The above-described SS set dropping rule may be different depending on the characteristics of the UE of each manufacturer. For example, whether the monitoring and BD of the UE may be performed serially and/or in parallel and how many times the monitoring and BD of the UE may be performed in parallel and/or serially may be different according to the capabilities of the UE. For example, the UE may report related characteristics (e.g., BD processing capability, etc.) to the BS through a capability transfer procedure. The BS may determine the SS set dropping rule with reference to the reported capabilities of the UE. An actual operation of the UE according to the determined the BD/CCE limit and the determined SS set dropping rule may be based on the characteristics of each UE.

4. Embodiment #4: Y Slot Window

When an X slot value increases, it is difficult to apply the BD limit of the legacy NR system to all X slots or monitoring all of the X slots in order to apply the SS set dropping rule may be a waste of resources. Accordingly, Y slots using at least one slot in the X slots as a window may be defined.

If the Y slots are configured for the UE, the above-described SS set dropping rule may be applied not to the X slots but to the Y slots. In other words, if the Y slots are configured, this may mean that all PDCCH MOs, which are within the X slots but outside the Y slots, are dropped.

For example, as illustrated in FIG. 10(a), if X=4, Y=2, and an MO of an SS set having a periodicity of one slot (e.g., an MO of a USS set or an MO of a CSS set) is allocated to every slot, the UE may apply the SS set dropping rule only to the Y slots, rather than all X slots. In other words, it may be appreciated that MO 2 and MO 3 in FIG. 10(a) are determined not to be monitored from the beginning without applying the SS set dropping rule.

In the present disclosure, in order to aid in understanding, the MOs outside the Y slots within the X slots, that are not candidates to which the SS set dropping rule is applied, are defined as early dropped MOs. The above-described SS set dropping rule is applied to MO 0 and MO 1 included in the Y slots and monitoring may be performed upon the corresponding MOs if the corresponding MOs are not dropped. For example, the SS set dropping rule of [Embodiment #3] may be applied to the first slot and the second slot. For example, for the CSS, monitoring may be performed in all four slots without limitation of the SS set dropping rule. In contrast, for the USS, monitoring of an SS set according to the SS set dropping rule of [Embodiment #3] may be performed in the first and second slots designated as the Y slots, and monitoring of the USS may not be performed in the third slot and the fourth slot.

In other words, if an SS set having an MO having a periodicity of one slot is a USS set, the UE may perform monitoring in the first slot and the second slot included in the Y slots by applying the SS set dropping rule and may not perform monitoring of the SS set in the third slot and the fourth slot. In contrast, if an SS set having an MO having a periodicity of one slot is a CSS set, the UE may apply the SS set dropping rule to all of the four slots in the X slots or may monitor the SS set without the BD/CCE limit.

If the periodicity of a specific SS set is configured as a multiple of X and an SS set duration is configured within Y for the UE configured with X and Y, the UE may apply the SS set dropping rule to the corresponding SS set without an early dropped MO and perform monitoring of the corresponding SS set. That is, in order to cause an MO not to be early dropped for a specific SS set, the periodicity of the specific SS set may be configured as a multiple of X and the duration of the specific SS set may be configured within Y.

Like the X slots, the Y slots may be a fixed value according to a specific condition or may be a value based on the capability report of the UE. For example, the UE may report capability information of a pair expressed by a combination of (X, Y) to the BS. If the UE reports a plurality of combinations of (X, Y) in the capability information to the BS, the BS may select any one of the plurality of combinations of (X, Y) and indicate the selected combination of (X, Y) to the UE.

Alternatively, a Y slot value may be sequentially changed according to a scheduling type. For example, although X=8 and Y=1 are initially configured, the UE may determine that more PDCCHs need to be monitored according to a scheduling situation while monitoring PDCCHs. In this case, the Y slot value may be sequentially increased to Y=2 up to Y=8, so that more PDCCHs may be monitored.

The Y slots may be variously located within the X slots. The simplest method for selecting a position of the Y slots without any additional configuration is that the Y slots may be located in the earliest Y slots in time within the X slots, as illustrated in FIG. 10(a).

Figure 11:
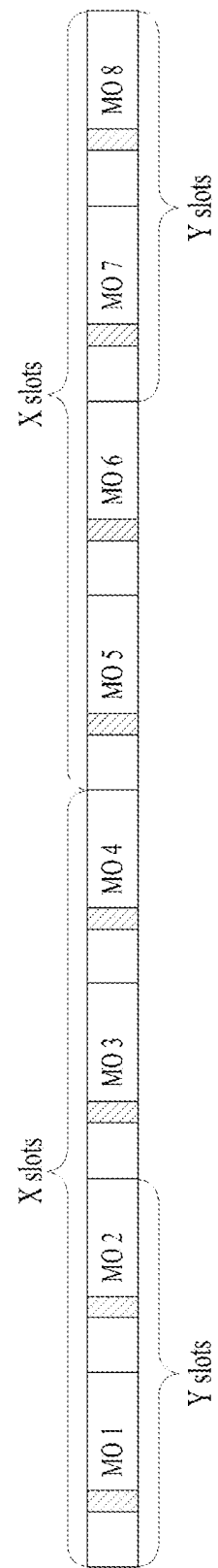

Alternatively, the position of the Y slots may be sequentially changed in every X slots by dividing the number of X slots by the number of Y slots using Ceil(X/Y). For example, as illustrated in FIG. 11, when X=4 and Y=2, the Y slots may be located in the first and second slots and seventh and eighth slots in every 8 slots (i.e., two X slots).

Figure 10:
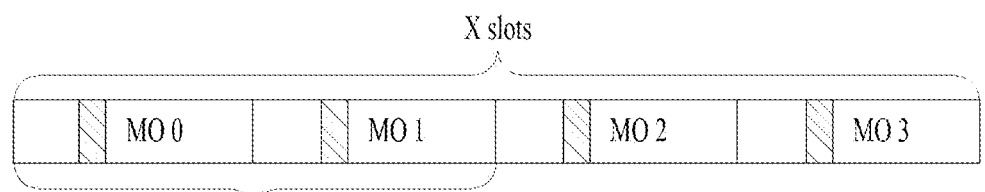
FIGS. 10 and 11 are diagrams for explaining a PDCCH monitoring gap according to an embodiment of the present disclosure.
Figure 10:
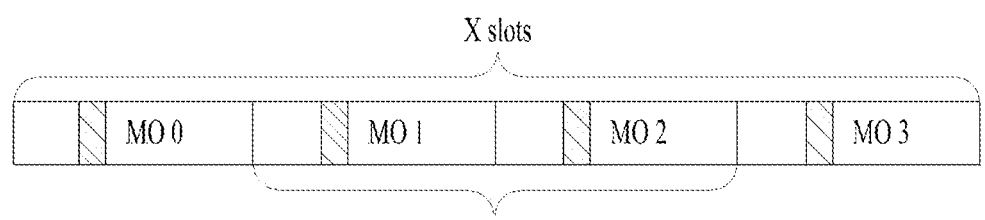
Figure 10:
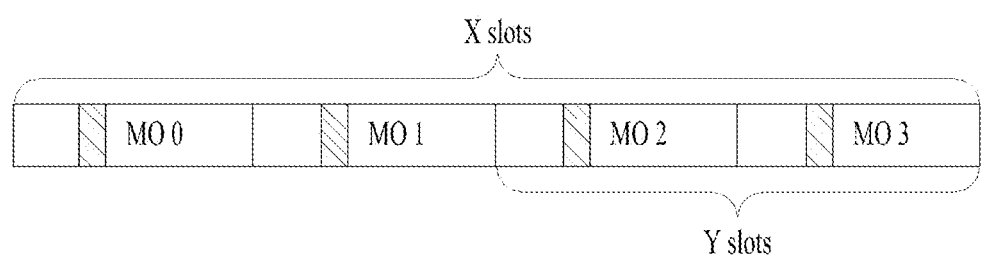
Figure 10:
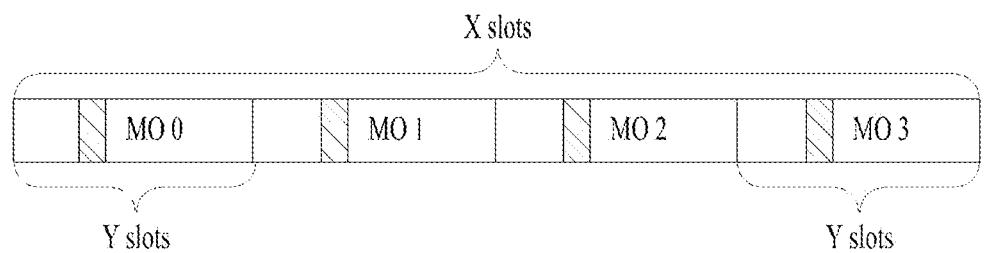

Alternatively, a starting slot of the Y slots may be sequentially selected. For example, when X=4 and Y=2 as illustrated in FIG. 10, in the first X slots, the first and second slots may be the Y slots (FIG. 10(a)); in the second X slots, the second and third slots may be the Y slots (FIG. 10(b)); in the third X slots, the third and fourth slots may be the Y slots (FIG. 10(c)); and in the fourth X slots, the fourth and first slots may be the Y slots.

The starting slot of the Y slots may be configured through RRC signaling of the BS and/or DCI. For example, the position of the Y slots may be configured for the UE by configuring an offset value through RRC signaling and/or the DCI. The above-described offset value may represent a relative distance between the starting slot of the X slots and the starting slot of the Y slots in units of slots or a relative distance between the starting point of a subframe in which the X slots are included and the starting slot of the Y slots in units of slots.

In addition, the starting position of the Y slots may be explicitly indicated. For example, the BS may indicate which slot in the X slots is the starting slot of the Y slots through RRC signaling and/or the DCI. Therethrough, the UE may obtain information about the starting slot of the Y slots.

As described above, if the Y slots are configured at various positions within the X slots, this may prevent monitoring of a specific SS set from always being excluded. For example, it is assumed that the X slots are configured to be aligned with the periodicities of the SS sets, and the priorities of the SS sets are determined in temporal order. If the periodicity of a specific SS set coincides with the X slot value or has a multiple relationship with the X slot value, the specific SS set may always be located in a later slot of the X slots in time according to an offset of the SS set. Then, the case in which the specific SS set is always excluded from monitoring of the UE according to the SS set dropping rule may occur.

Accordingly, if the Y slots may be configured at various positions within the X slots, the above-described problematic situation may be prevented by sequentially selecting the position of the Y slots within the X slots as described above.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 12 illustrates a communication system 1 applied to the present disclosure.

Referring to FIG. 12, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HIVID), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul(IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 13:
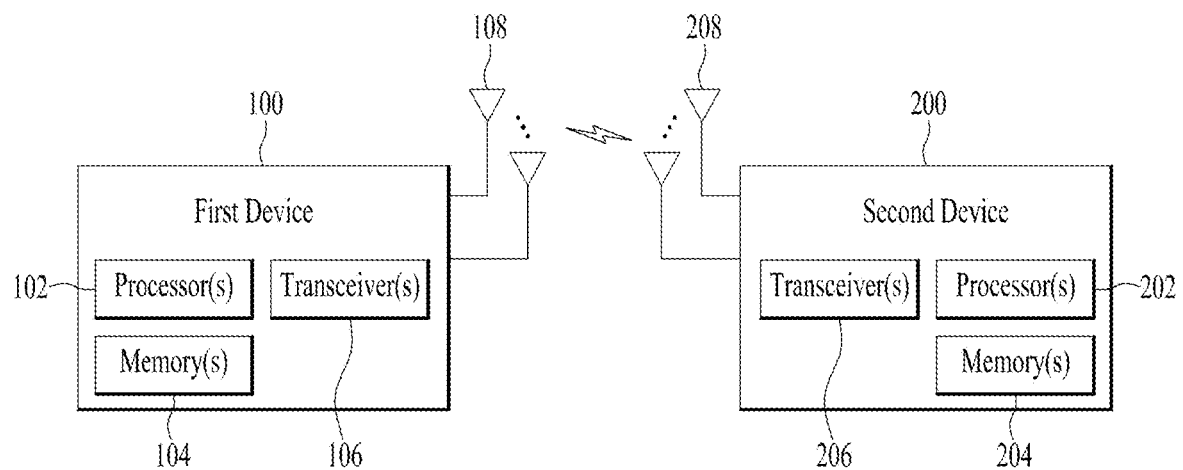
FIG. 13 illustrates an exemplary wireless device applicable to the present disclosure.

FIG. 13 illustrates wireless devices applicable to the present disclosure.

Referring to FIG. 13, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 26.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor 102 of the first wireless device 100 and stored in the memory 104 of the first wireless device 100, according to an embodiment of the present disclosure will now be described.

Although the following operations will be described based on a control operation of the processor 102 in terms of the processor 102, software code for performing such an operation may be stored in the memory 104. For example, in the present disclosure, the at least one memory 104 may store instructions or programs as a computer-readable storage medium. The instructions or the programs may cause, when executed, at least one processor operably connected to the at least one memory to perform operations according to embodiments or implementations of the present disclosure, related to the following operations.

Specifically, the processor 102 may control the transceiver 106 to receive first information about an SS set and/or second information related to a PDCCH monitoring gap from the BS. In this case, the processor 102 may control the transceiver 106 to receive the first information and/or the second information through RRC. The second information may include, for example, at least one of an X slot value when the PDCCH monitoring gap is extended, a new SS set dropping rule, a Y slot value for applying the dropping rule, or a periodicity of SS set monitoring for the extended PDCCH monitoring gap. The first information may include a plurality of pieces of information about the SS set. The second information may also include a plurality of pieces of information related to the PDCCH monitoring gap.

For example, the second information may include a plurality of X slot values, SS set dropping rules, Y slot values, and/or periodicities of SS set monitoring for the extended PDCCH monitoring gap.

Details of this operation may be based on [Embodiment #1] to [Embodiment #4].

The processor 102 may control the transceiver 106 to transmit capability information for the PDCCH monitoring gap to the BS in order to extend the PDCCH monitoring gap. In this case, the processor 102 may control the transceiver 106 to transmit the capability information to the BS in the form of (X, Y), which is a combination of the X slot value and the Y slot value, through RRC signaling and/or UCI. Details of this operation may be based on [Embodiment #4].

The processor 102 may control the transceiver 106 to receive third information related to the PDCCH monitoring gap from the BS. For example, if a plurality of pieces of information related to the PDCCH monitoring gap is included in the second information, any one of the plurality of pieces of information may be indicated through DCI or a MAC CE.

Details of this operation may be based on [Embodiment #1] to [Embodiment #4].

When it is determined that it is necessary to require power saving of the UE or to reduce load, the processor 102 may make a request for such determination to the BS through the transceiver 106.

If it is determined that there is no information/channels to be transmitted to the UE by the BS for a predetermined time although the processor 102 does not control the transceiver 106 to transmit the capability information, the third information may be indicated for power saving of the UE.

Only one of capability information transmission and third information reception may be performed. For example, if capability information transmission is performed, third information reception may be omitted, and if capability information transmission is omitted, third information reception may be performed. Alternatively, both capability information transmission and third information reception may be omitted according to an operation related to a timer to be described later.

However, it is obvious that capability information transmission and third information reception may be performed together. For example, if the processor 102 controls the transceiver 106 to transmit a plurality of (X, Y) combinations, the processor 102 may control the transceiver 106 to receive the third information in which any one of the plurality of (X, Y) combinations is included from the BS.

When a timer related to data transmission (e.g., a timer which is associated with a MAC timer or a DRX timer or configured separately) expires, it may be expected that the UE and the BS will perform an operation for extending the PDCCH monitoring gap even without a separate indication or request.

The above-described capability information transmission and/or the indication of the BS may be initiated through DCI and/or UCI and is not limited to a specific format. The above-described capability information transmission and/or the indication of the BS may also be performed through the MAC CE or RRC.

The above-mentioned capability information transmission of the UE, the indication of the BS, and the operation of the timer are called triggering.

The PDCCH monitoring gap may be extended after a predetermined time from triggering. The predetermined time may be predefined or the processor 102 may control the transceiver 106 to receive information about the predetermined time through RRC signaling and/or the DCI. Therethrough, a PDCCH monitoring starting timing caused by the extended PDCCH monitoring gap may be determined.

To indicate release/termination of the UE operation based on PDCCH monitoring gap extension, the same method as any one of the methods used for initiation of the UE operation (e.g., the above-described three triggering operations) based on PDCCH monitoring gap extension may be used.

The processor 102 may control the transceiver 106 to receive a PDCCH from the BS based on information about the SS set dropping rule and/or the PDCCH monitoring gap based on the first information, the second information, and/or the third information.

Details of this operation may be based on [Embodiment #1] to [Embodiment #4].

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 200 and stored in the memory 204 of the second wireless device 200, according to an embodiment of the present disclosure will now be described.

Although the following operations will be described based on a control operation of the processor 202 in terms of the processor 202, software code for performing such an operation may be stored in the memory 204. For example, in the present disclosure, the at least one memory 204 may store instructions or programs as a computer-readable storage medium. The instructions or the programs may cause, when executed, at least one processor operably connected to the at least one memory to perform operations according to embodiments or implementations of the present disclosure, related to the following operations.

Specifically, the processor 202 may control the transceiver 206 to transmit the first information about the SS set and/or the second information related to the PDCCH monitoring gap to the UE. In this case, the processor 202 may control the transceiver 206 to transmit the first information and/or the second information through RRC. The second information may include, for example, at least one of the X slot value when the PDCCH monitoring gap is extended, the new SS set dropping rule, the Y slot value for applying the dropping rule, or the periodicity of SS set monitoring for the extended PDCCH monitoring gap. The first information may include a plurality of pieces of information about the SS set. The second information may also include a plurality of pieces of information related to the PDCCH monitoring gap.

For example, the second information may include a plurality of X slot values, SS set dropping rules, Y slot values, and/or periodicities of SS set monitoring for the extended PDCCH monitoring gap.

Details of this operation may be based on [Embodiment #1] to [Embodiment #4].

The processor 302 may control the transceiver 306 to receive the capability information for the PDCCH monitoring gap from the UE in order to extend the PDCCH monitoring gap. In this case, the processor 202 may control the transceiver 206 to receive the capability information from the UE in the form of (X, Y), which is a combination of the X slot value and the Y slot value, through RRC signaling and/or the UCI. Details of this operation may be based on [Embodiment #4].

The processor 202 may control the transceiver 206 to transmit the third information related to the PDCCH monitoring gap to the UE. For example, if a plurality of pieces of information related to the PDCCH monitoring gap is included in the second information, any one of the plurality of pieces of information may be indicated through the DCI or the MAC CE.

Details of this operation may be based on [Embodiment #1] to [Embodiment #4].

When it is determined that it is necessary to require power saving of the UE or reduce load, the processor 202 may receive such a request from the UE through the transceiver 206.

If it is determined that there is no information/channels to be transmitted to the UE by the processor 202 for a predetermined time although the processor 202 does not control the transceiver 206 to receive the capability information, the third information may be indicated for power saving of the UE.

Only one of capability information reception and third information transmission may be performed. For example, if capability information reception is performed, third information transmission may be omitted, and if capability information reception is omitted, third information transmission may be performed. Alternatively, both capability information reception and third information transmission may be omitted according to an operation related to a timer to be described later.

However, it is obvious that capability information reception and third information transmission may operate together. For example, if the processor 202 controls the transceiver 206 to receive a plurality of (X, Y) combinations, the processor 202 may control the transceiver 206 to transmit the third information in which any one of the plurality of (X, Y) combinations is included to the UE.

When a timer related to data transmission (e.g., a timer which is associated with the MAC timer or DRX timer or configured separately) expires, it may be expected that the UE and the BS will perform an operation for extending the PDCCH monitoring gap even without a separate indication or request.

The above-described capability information transmission and/or the indication of the processor 202 may be initiated through the DCI and/or the UCI and is not limited to a specific format. The above-described capability information transmission and/or the indication of the BS may also be performed through the MAC CE or RRC.

The above-mentioned capability information transmission of the UE, the indication of the processor 202, and the operation of the timer are called triggering.

The PDCCH monitoring gap may be extended after a predetermined time from triggering. The predetermined time may be predefined or the processor 202 may control the transceiver 206 to transmit information about the predetermined time to the UE through RRC signaling and/or the DCI. Therethrough, a PDCCH monitoring starting timing caused by the extended PDCCH monitoring gap may be determined.

To indicate release/termination of the UE operation based on PDCCH monitoring gap extension, the same method as any one of the methods used for initiation of the UE operation (e.g., the above-described three triggering operations) based on PDCCH monitoring gap extension may be used.

The processor 202 may control the transceiver 206 to transmit the PDCCH to the UE based on the information about the SS set dropping rule and/or the PDCCH monitoring gap based on the first information, the second information, and/or the third information.

Details of this operation may be based on [Embodiment #1] to [Embodiment #4].

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 14:
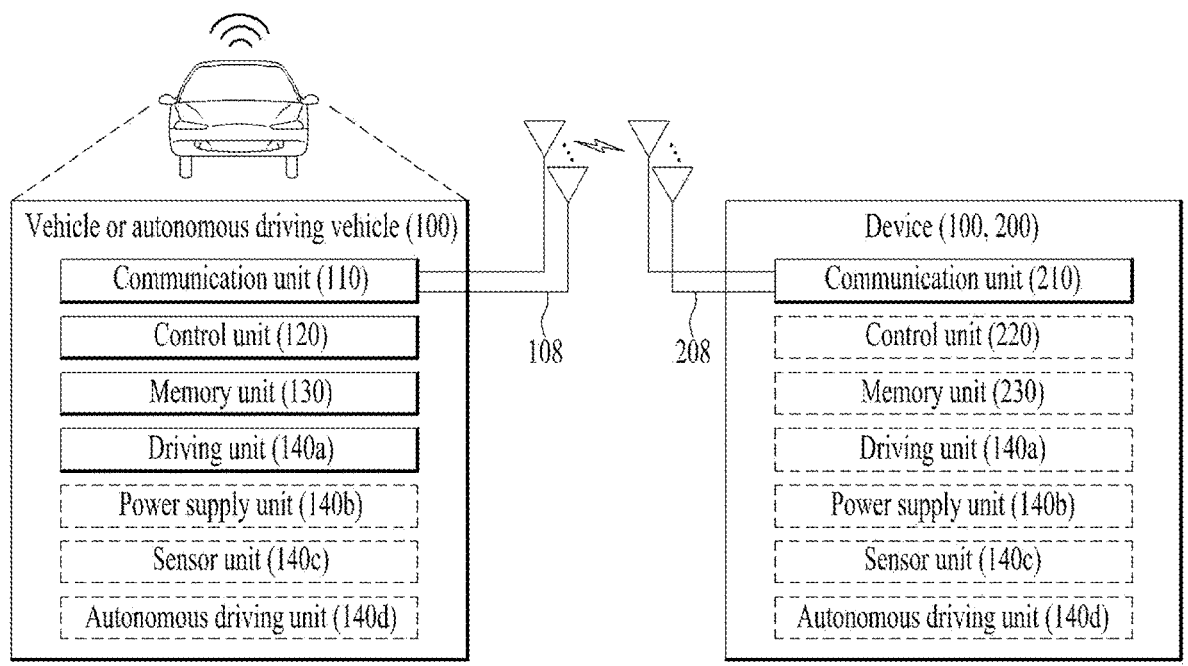
FIG. 14 illustrates an exemplary vehicle or autonomous driving vehicle applicable to the present disclosure.

FIG. 14 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 14, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the above-described method of transmitting and receiving a DL control channel and the apparatus therefor have been described based on an example applied to a 5G NR system, the method and apparatus are applicable to various wireless communication systems in addition to the 5G NR system.

The invention claimed is:

1. A method of receiving a physical downlink control channel (PDCCH) through a search space (SS) set by a user equipment (UE) in a wireless communication system, the method comprising:
transmitting capability information related to a number of X slots and a number of at least one Y slot for PDCCH monitoring; and
receiving a first PDCCH through a UE-specific SS (USS) set within the at least one Y slot, based on the capability information,
wherein the at least one Y slot is included in the X slots, and X and Y are positive integers,
wherein a monitoring periodicity of the USS set is an integer multiple of a length of the X slots, and
wherein a number of monitored PDCCH candidates and a number of non-overlapped control channel elements (CCEs) are determined based on all search space sets within the X slots.

2. The method of claim 1, wherein a second PDCCH is received through a common SS (CSS) set within the X slots.

3. The method of claim 2, wherein a CSS set to be monitored within the Y slot is determined to have a higher priority than a USS set to be monitored within the Y slot.

4. The method of claim 1, wherein the capability information is represented as (X, Y) which is a combination of the number of X slots and the number of the at least one Y slot.

5. The method of claim 1, wherein the X slots are continuous and the at least one Y slot is continuous.

6. The method of claim 1, wherein a starting slot of the at least one Y slot is not aligned with a starting slot of the X slots.

7. A non-transitory medium which is readable by a processor and storing instructions cause the processor to perform the method of claim 1.

8. A user equipment (UE) for receiving a physical downlink control channel (PDCCH) through a search space (SS) set in a wireless communication system, the UE comprising:
at least one transceiver;
at least one processor; and at least one memory operably connected to the at least one processor and configured to store instructions causing, when executed, the at least one processor to perform operations comprising:

transmitting, through the at least one transceiver, capability information related to a number of X slots and a number of at least one Y slot for PDCCH monitoring, and receiving, through the at least one transceiver, a first PDCCH through a UE-specific SS (USS) set within the at least one Y slot, based on the capability information, and wherein the at least one Y slot is included in the X slots, and X and Y are positive integers, wherein a monitoring periodicity of the USS set is an integer multiple of a length of the X slots, and wherein a number of monitored PDCCH candidates and a number of non-overlapped control channel elements (CCEs) are determined based on all search space sets within the X slots.

9. The UE of claim 8, wherein a second PDCCH is received through a common SS (CSS) set within the X slots.

10. The UE of claim 9, wherein a CSS set to be monitored within the Y slot is determined to have a higher priority than a USS set to be monitored within the Y slot.

11. The UE of claim 8, wherein the capability information is represented as (X, Y) which is a combination of the number of X slots and the number of the at least one Y slot.

12. The UE of claim 8, wherein the X slots are continuous and the at least one Y slot is continuous.

13. The UE of claim 8, wherein a starting slot of the at least one Y slot is not aligned with a starting slot of the X slots.

14. A method of transmitting a physical downlink control channel (PDCCH) through a search space (SS) set by a base station (BS) in a wireless communication system, the method comprising:

receiving capability information related to a number of X slots and a number of at least one Y slot; and transmitting a PDCCH through a UE-specific SS (USS) set within the at least one Y slot, based on the capability information, and wherein the at least one Y slot is included in the X slots, and X and Y are positive integers, wherein a monitoring periodicity of the USS set is an integer multiple of a length of the X slots, and wherein a number of monitored PDCCH candidates and a number of non-overlapped control channel elements (CCEs) are determined based on all search space sets within the X slots.

* * * * *